United States Patent [19]

Keener et al.

[11] Patent Number: 5,701,514

[45] Date of Patent: Dec. 23, 1997

[54] SYSTEM PROVIDING USER DEFINABLE SELECTION OF DIFFERENT DATA TRANSMISSION MODES OF DRIVERS OF AN I/O CONTROLLER TRANSMITTING TO PERIPHERALS WITH DIFFERENT DATA TRANSMISSION RATE

[75] Inventors: Don Steven Keener; Gregory James Moore, both of Boca Raton, Fla.

[73] Assignee: International Business Machines Corporation, Armond, N.Y.

[21] Appl. No.: 221,952

[22] Filed: Apr. 1, 1994

[51] Int. Cl.⁶ .............................. G06F 13/00; G06F 13/14
[52] U.S. Cl. ............... 395/834; 395/849; 395/853; 395/880; 395/882; 395/284; 364/238.3; 364/926.91; 364/926.93; 364/927.99
[58] Field of Search ..................... 395/831, 834, 395/880, 892, 325, 250, 575, 849, 853, 882, 284; 379/97; 380/3; 364/200, 238.3, 926.91, 926.93, 927.99

[56] References Cited

U.S. PATENT DOCUMENTS

| | | | |
|---|---|---|---|
| 3,950,735 | 4/1976 | Patel | 340/172.5 |
| 3,970,997 | 7/1976 | Daly et al. | 340/172.5 |
| 4,454,591 | 6/1984 | Lou | 364/900 |
| 4,467,445 | 8/1984 | Mueller et al. | 364/900 |
| 4,507,732 | 3/1985 | Catiller et al. | 364/200 |
| 4,509,113 | 4/1985 | Heath | 364/200 |
| 4,556,959 | 12/1985 | Allen et al. | 364/900 |
| 4,858,038 | 8/1989 | Kazama | 360/69 |
| 4,972,470 | 11/1990 | Farago | 380/3 |
| 5,077,732 | 12/1991 | Fischer et al. | 370/85.4 |
| 5,283,872 | 2/1994 | Ohnishi | 395/325 |
| 5,287,462 | 2/1994 | Jibbe et al. | 395/275 |
| 5,333,277 | 7/1994 | Searls | 395/325 |
| 5,343,515 | 8/1994 | Treffkorn | 379/97 |
| 5,361,346 | 11/1994 | Panesar et al. | 395/575 |
| 5,386,517 | 1/1995 | Sheth et al. | 395/275 |
| 5,414,816 | 5/1995 | Oyadomari | 395/275 |
| 5,544,326 | 8/1996 | Pease et al. | 395/250 |

FOREIGN PATENT DOCUMENTS

| | | | |
|---|---|---|---|
| A473279 | 3/1992 | European Pat. Off. | G06F 13/22 |
| A535873 | 4/1993 | European Pat. Off. | H03K 19/0185 |

*Primary Examiner*—Thomas C. Lee
*Assistant Examiner*—Ki S. Kim
*Attorney, Agent, or Firm*—Bernard D. Bogdon

[57] ABSTRACT

A computing system with a SCSI controller includes SCSI transmission mode selection apparatus and method to switch the transmission line drivers between transmitting in SCSI 1, SCSI 2 or another mode. The controller selects a maximum data transmission rate compatible with each peripheral device connected to the controller. A user-defined option code is decoded by the controller to provide the user with control over transmission mode options for the drivers in the controller. Based on the data transmission rate and the selected option, the controller selects the SCSI transmission mode to use for each driver type, acknowledge line or data lines.

17 Claims, 11 Drawing Sheets

| | OPTION BITS | | | >5 MHZ | DATA PHASE | DC | | TPU | | OPEN DRAIN | |
|---|---|---|---|---|---|---|---|---|---|---|---|
| | 2 | 1 | 0 | | | DATA | ACK | DATA | ACK | DATA | ACK |
| | X | X | X | X | 0 | 0 | 0 | 0 | 0 | 1 | 1 |
| | 0 | 0 | 0 | 0 | 1 | 0 | 0 | 1 | 1 | 0 | 0 |
| | 0 | 0 | 1 | 0 | 1 | 0 | 0 | 0 | 1 | 1 | 0 |
| | 0 | 1 | 0 | 0 | 1 | 0 | 0 | 0 | 0 | 1 | 1 |
| | 0 | 1 | 1 | 0 | 1 | 0 | 1 | 0 | 0 | 1 | 0 |
| | 1 | 0 | 0 | 0 | 1 | 0 | 1 | 1 | 0 | 0 | 0 |
| OPTION 5 → | 1 | 0 | 1 | 0 | 1 | 0 | 0 | 0 | 0 | 1 | 1 |
| | 1 | 1 | 0 | 0 | 1 | 0 | 0 | 1 | 1 | 0 | 0 |
| | 1 | 1 | 1 | 0 | 1 | 0 | 0 | 0 | 0 | 1 | 1 |
| | 0 | 0 | 0 | 1 | 1 | 0 | 0 | 1 | 1 | 0 | 0 |
| | 0 | 0 | 1 | 1 | 1 | 0 | 0 | 0 | 1 | 1 | 0 |
| | 0 | 1 | 0 | 1 | 1 | 0 | 0 | 0 | 0 | 1 | 1 |
| | 0 | 1 | 1 | 1 | 1 | 0 | 1 | 0 | 0 | 1 | 0 |
| | 1 | 0 | 0 | 1 | 1 | 0 | 1 | 1 | 0 | 0 | 0 |
| OPTION 5 → | 1 | 0 | 1 | 1 | 1 | 0 | 0 | 1 | 1 | 0 | 0 |
| | 1 | 1 | 0 | 1 | 1 | 0 | 1 | 1 | 0 | 0 | 0 |
| | 1 | 1 | 1 | 1 | 1 | 0 | 1 | 1 | 0 | 0 | 0 |

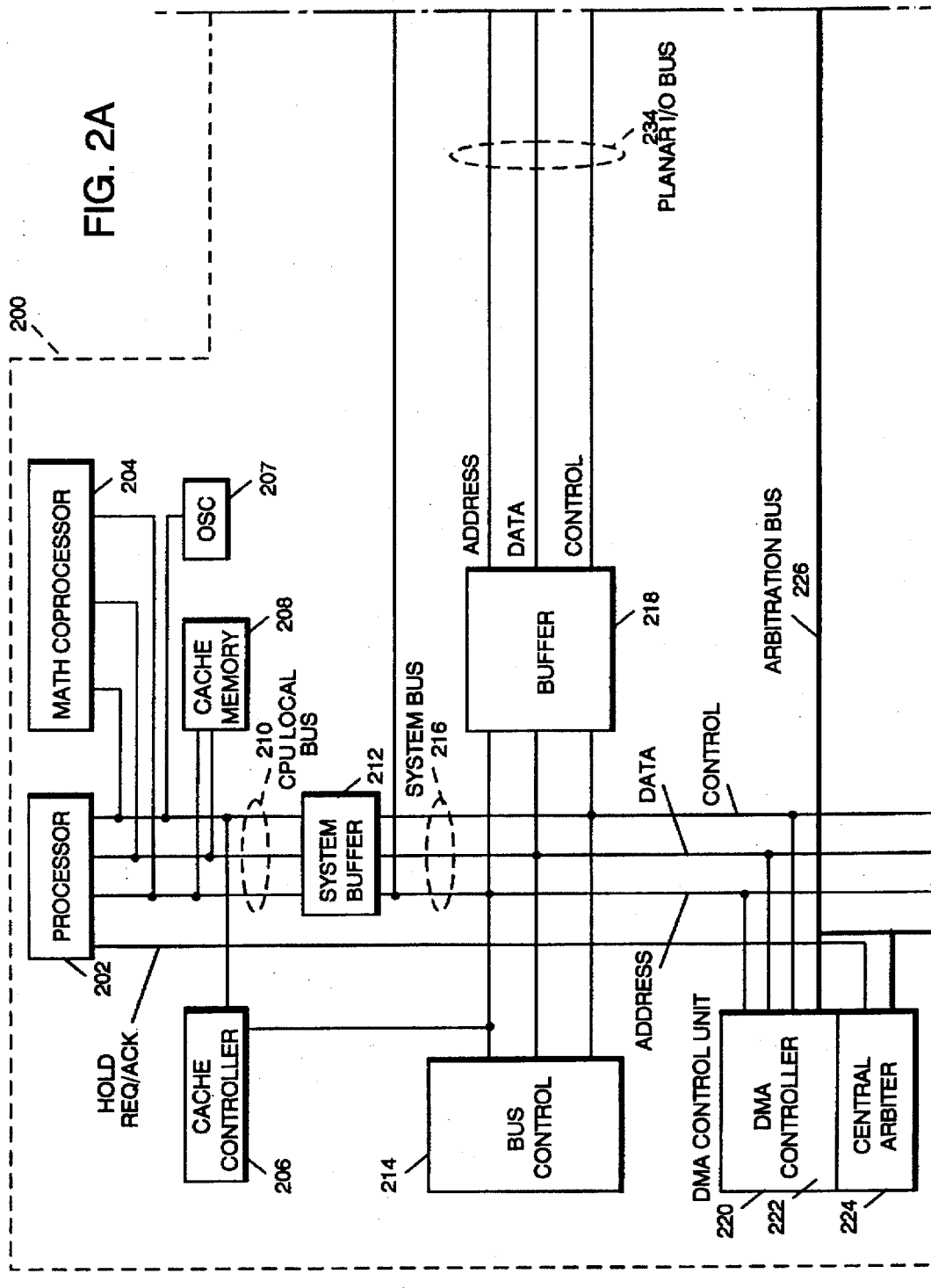

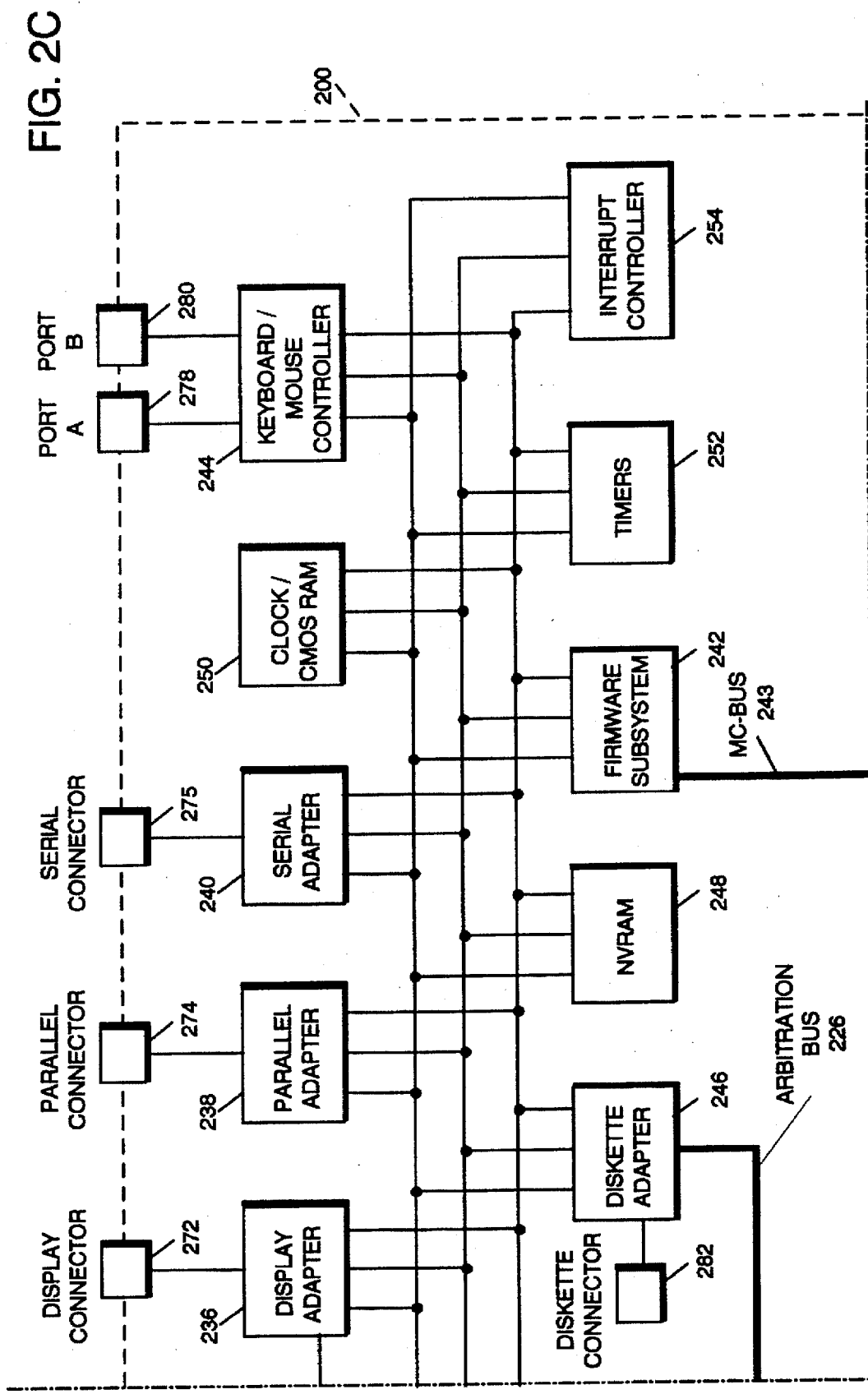

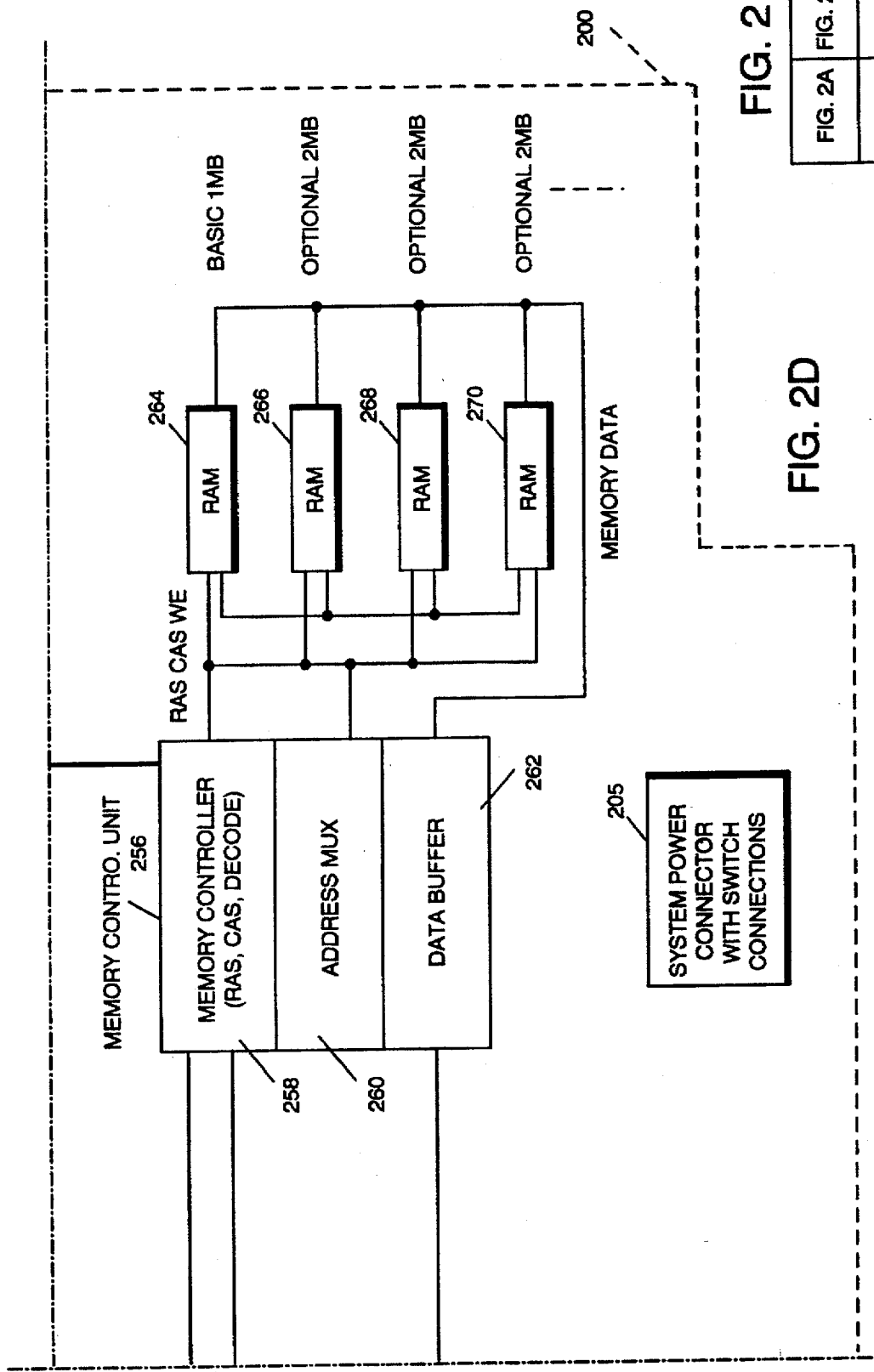

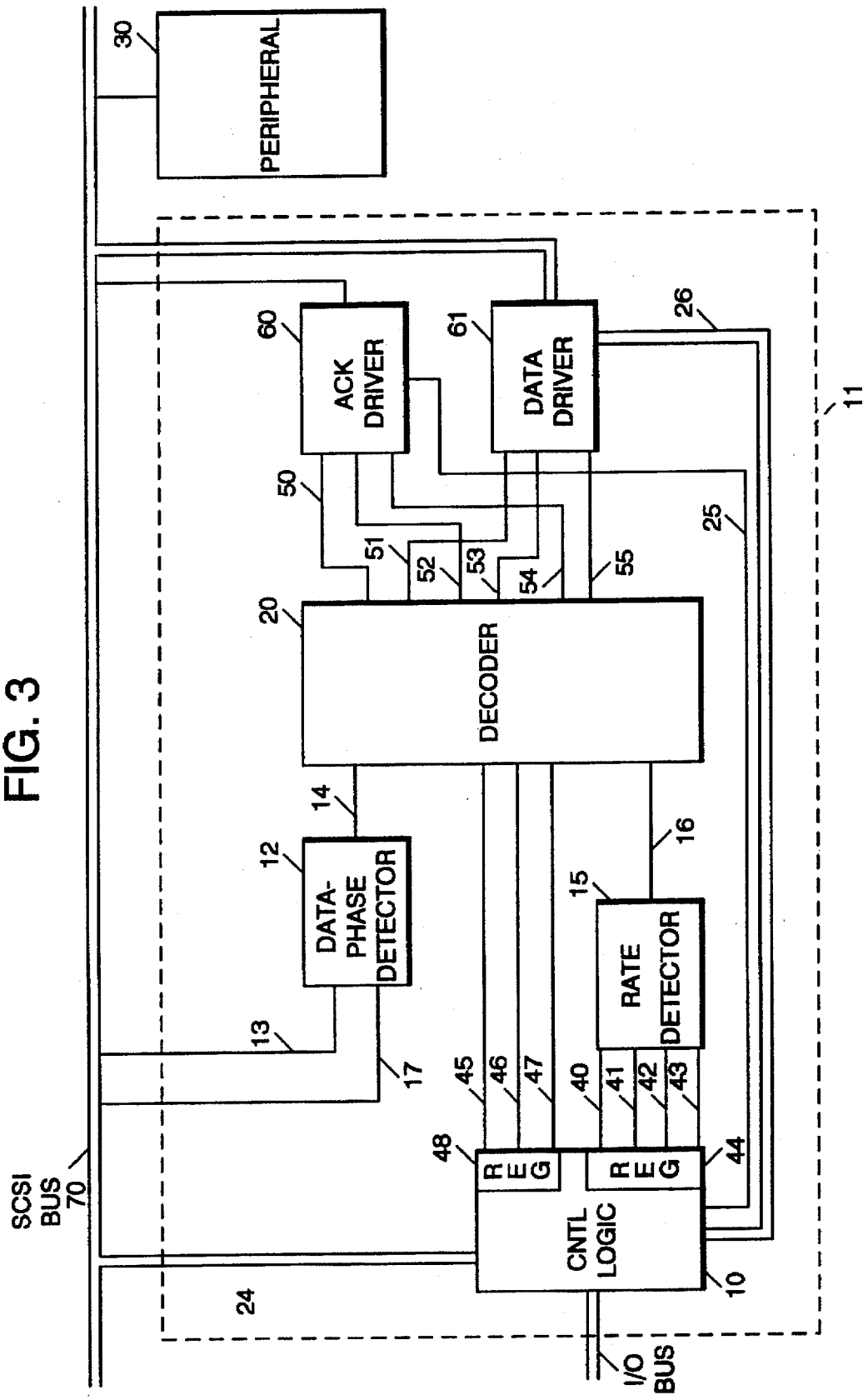

FIG. 6

SYSTEM PROVIDING USER DEFINABLE SELECTION OF DIFFERENT DATA TRANSMISSION MODES OF DRIVERS OF AN I/O CONTROLLER TRANSMITTING TO PERIPHERALS WITH DIFFERENT DATA TRANSMISSION RATE

BACKGROUND OF THE INVENTION

1. Field of the Invention

This invention relates to apparatus and methods for interfacing an input/output (I/O) controller with multiple peripheral devices having different transmission modes on the I/O bus. More particularly, the invention relates to a SCSI controller for a SCSI bus which has both SCSI 1 mode, SCSI 2 mode and other mode peripherals attached to it.

2. Description of the Prior Art

SCSI (Small Computer System Interface) is an ANSI standard interface to connect personal computers to peripherals, such as hard files and CD ROM devices. Older technology SCSI devices (SCSI 1) could handle data rates up to 5 MHz. The rate limitation is due to the slope of the edges in the binary-signal transitions. The SCSI 1 transmitter drivers operating in open drain mode were designed to make the transition edges less steep. This minimized the slew-rate generated noise to the unfiltered Transistor Transistor Logic (TTL) receivers.

Newer technology devices (SCSI 2) operate at data rates up to 10 MHz. To handle these higher data rates, it was necessary to increase the slope of the binary-signal transition edges to meet data setup and hold timings. This increased edge slope resulted in greater slew-rate noise. To handle the faster slew rate, the new TTL transmitters operate in transient pull-up (TPU) mode, and the TTL receivers are filtered.

TTL transmitters are typically configured with first and second Field Effect Transistors (FETs). The source of the first transistor is connected to the drain of the second transistor. A transmission line is attached at this source-to-drain connection between the two FETs. SCSI 1 mode is also known as the open drain mode. In the open drain mode, the high to low transition on the line is accomplished by activating the second FET. Low to high transition is accomplished passively without activating the first transistor. Instead, the external SCSI terminator circuit (resistor) on the transmission line causes the signal to be pulled high. Transient pull-up mode accomplishes high to low transition in the same manner as open drain mode. Low to high transition is accomplished actively by activating the first FET. However, upon the transmission line signal reaching the high level, the first FET is deactivated. This results in a transition that "looks like" open drain mode except the transition is faster and cleaner. DC mode is similar to transient pull-up mode, except the first FET is not deactivated after it pulls up the transmission line signal. A TTL transmitter operating in DC mode is sometimes referred to as a totem pole driver.

Older SCSI 1 peripheral devices have difficulty handling the newer SCSI 2 transmission modes because the higher slew-rate noise causes false triggering of the receivers in the SCSI 1 devices. Merely using the lower data rate appropriate to such devices does not solve this problem because SCSI 2 transient pull-up mode at the TTL transmitter produces transition edges with slopes too great for the older SCSI 1 devices to handle.

SUMMARY OF THE INVENTION

In accordance with this invention, apparatus and methods allow an I/O controller to switch between SCSI 1, SCSI 2, and other transmission driving modes, based on the capabilities of the peripheral device being accessed. An I/O controller switches between transmitting in SCSI 1 mode, SCSI 2 mode and a third mode based on the data rate capability of the peripheral receiving the transmission. Further, the controller has user-settable parameters so that different modes may be set for different types of drivers; i.e., the acknowledge signal driver and the data line drivers. In normal data operations by the I/O controller, the controller detects the data rate capacity of the peripheral device, selects a data transmission rate closest to the maximum rate of the peripheral, combines this selected rate information with the user-settable parameters to set the data transmission mode to SCSI 1 or SCSI 2. The transmission line drivers are then enabled to operate in the desired transmission mode. As a further feature of this invention, the controller sets the transmission mode for all drivers to open drain, or SCSI 1 mode if the controller is operating in a non-data phase in communicating with the peripheral devices.

Those having normal skill in the art will recognize other objects, features, advantages and applications of the present invention from the following more detailed description of the preferred embodiments as illustrated in the accompanying drawings.

BRIEF DESCRIPTION OF THE DRAWINGS

FIG. 2 is a block diagram of the computer in FIG. 1 and is illustrated as including FIGS. 2A, 2B, 2C and 2D.

FIG. 2A is a portion of the block diagram of FIG. 2.

FIG. 2C is a portion of the block diagram of FIG. 2.

FIG. 2D is a portion of the block diagram of FIG. 2.

FIG. 3 is a schematic diagram of one preferred embodiment of the I/O or SCSI controller 231 in FIG. 2.

FIG. 6 is the logic, or truth table, illustrating the input conditions for and output signals from decoder 20 in FIG. 3, or select operations 37, 38 and 39 in FIG. 5C.

DETAILED DESCRIPTION OF THE PREFERRED EMBODIMENTS

Computer System

Figure 1:
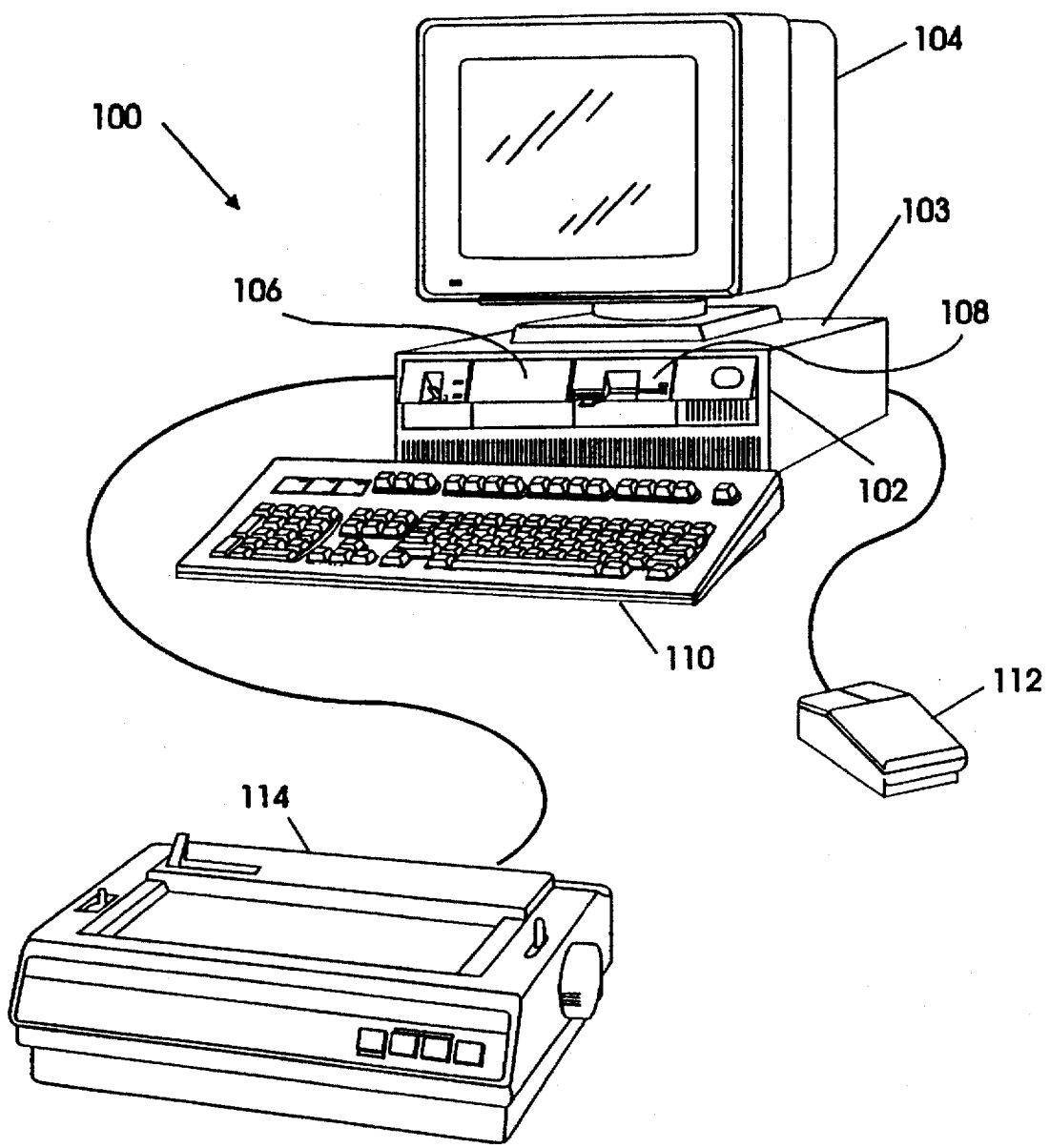
FIG. 1 shows a computer which employs the SCSI controller in the present invention.

Referring now to the figures, and in particular to FIG. 1, there is shown a personal Computer system 100 which is capable of operating with an I/O controller in accordance with the present invention. The personal computer system 100 comprises a system unit 102 having a suitable enclosure or casing 103, output device or monitor 104 (such as a conventional video display), input devices such as a keyboard 110, an optional mouse 112, and an optional output device such as a printer 114. Finally, the system unit 102 may include one or more mass storage devices, such as a diskette drive 108 (operable with a diskette—not shown) and a hard disk drive (DASD). As is well known, each storage system unit 102 system unit 102 device has a storage medium for storing information for configuring, operating the computer system, as well as application programs for processing data.

In normal use, the personal computer system 100 is designed to give independent computing power to a small group of users as a server in a Local Area Network (LAN) or to a single user, and is inexpensively priced for purchase by individuals or small businesses. In operation, a processor 202 (FIGS. 2 and 4) functions under an operation system, such as IBM's OS/2 operating system or a DOS operating system, suitably loaded and stored within the system unit 102. The operating system typically utilizes a BIOS interface between the I/O devices and the operating system. BIOS provides an interface between the hardware devices and the operating system software to enable a programmer or user to program the machine without an in-depth operating knowledge of a particular hardware device. For example, a BIOS diskette module permits a programmer to program the diskette drive without an in-depth knowledge of the diskette drive hardware. Thus, a number of diskette drives designed and manufactured by different companies can be used within the system 100. This not only lowers the cost of the system, but also permits a user to choose from a number of diskette drives. BIOS is more clearly defined in the IBM Personal System/2 and Personal Computer BIOS Interface Technical Reference 1991, which is hereby incorporated by reference herein.

Figure 2B:
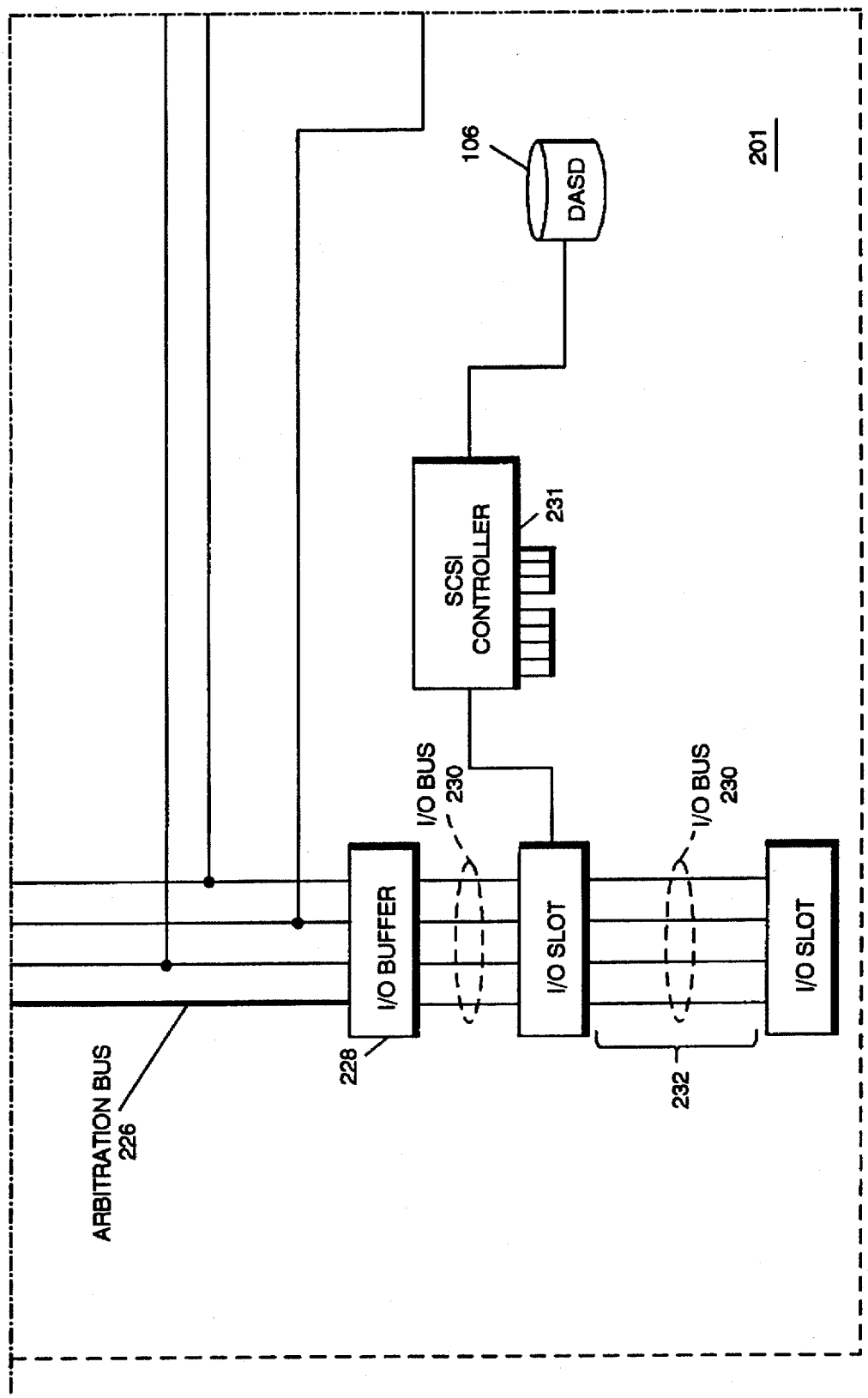
FIG. 2B is a portion of the block diagram of FIG. 2.

Referring to FIG. 2, there is shown a block diagram of a unified planar 200 of the system unit 102. The planar 200 includes a Printed Circuit Board (PCB) 201 upon which are mounted, or connected, a number of input/output bus connectors 232 having I/O slots, a processor 202 which is connected by a high speed CPU local bus 210 under control of a bus control unit 214 to a memory control unit 256. The unit 256 is further connected to a main memory such as volatile Random Access Memory (RAM) 264. Any appropriate processor 202 can be used, such as an Intel 80386, Intel 80486, or the like. A system power connector 205 is mounted on the PCB 201 for connection to a power unit (not shown) that supplies the necessary power for the system 100.

The CPU local bus 210 (comprising address, data and control components) provides for the interconnection of the processor 202, an optional math coprocessor 204, an optional cache controller 206, and an optional cache memory 208. As described later in detail, the existence and size of the cache memory and the processor 202's configuration determine the processor type for the personal computer system 100.

Also coupled onto the CPU local bus 210 is a system buffer 212. The system buffer 212 is itself connected to a system bus 216 which comprises address, data and control components. The system bus 216 extends between the system buffer 212 and an I/O buffer 228. The system bus 216 is further connected to the bus control unit 214, and to a Direct Memory Access (DMA) control unit 220. The DMA control unit 220 includes a central arbiter 224 and a DMA controller 222. The I/O buffer 228 provides an interface between the system bus 216 and an I/O bus 230.

An oscillator 207 is connected as shown for providing suitable clock signals to the computer system 100. Those skilled in the art will recognize that while the preferred embodiment is implemented on the MICRO CHANNEL bus of an IBM PS/2 computer system, which is well known in the art, alternative bus architectures could also be used to employ the invention.

Connected to the I/O bus 230 is a plurality of I/O bus connectors having slots 232 for receiving adapter cards which may be further connected to I/O peripheral devices or memory. As shown, one of the I/O connectors is connected to a Small Computer System Interface (SCSI) controller adaptor card 231 which controls the hardfile 106.

An arbitration bus 226 couples the DMA controller 222 and the central arbiter 224 to the I/O connectors 232 and a diskette adapter 246. Also connected to the system bus 216 is the memory control unit 256 which includes a memory controller 258, an address multiplexer 260, and a data buffer 262. The memory control unit 256 is further connected to the main memory, such as the random access memory, as represented by the RAM module 264. The memory control unit 256 includes logic for mapping addresses to and from the processor 202 to and from particular areas of the RAM 264. While the system 100 is shown with a basic one megabyte RAM module 264, it is understood that additional memory can be interconnected as represented in FIG. 2 by optional memory modules 266, 268, 270.

A buffer 218 is coupled between the system bus 216 and a planar I/O bus 234. The planar I/O bus 234 includes address, data, and control components. Coupled along the planar I/O bus 234 are a variety of I/O adapters and other peripheral components, such as a display adapter 236 (which is used to drive the optional display 104), a clock/CMOS RAM 250, a nonvolatile RAM 248 (hereinafter referred to as NVRAM), a serial adapter 240 (other common terms used for "serial" are "asynchronous" and RS232), a parallel adapter 238, a plurality of timers 252, the diskette adapter 246, a keyboard/mouse controller 244, an interrupt controller 254, and a firmware subsystem 242. The firmware subsystem 242 typically includes a nonvolatile program store (e.g., ROM) which contains a portion of POST and BIOS programs known as stage 1 POST. As described later in detail, stage 1 POST is used for an initial and limited system testing, and includes routines for loading a stage II POST, which is also known as Initial Micro Load Image (IMI), from an external storage device, such as the floppy drive 108 or the hardfile 106.

The clock/CMOS RAM 250 is used for time of day calculations. The NVRAM 248 is used to store system configuration data. That is, the NVRAM 248 will contain values which describe the present configuration of the system 100. The NVRAM 248 contains information which describes, for example, adapter card initialization data, capacity of a fixed disk or a diskette, the amount of main memory, etc. Furthermore, these data are stored in NVRAM 248 whenever a configuration program is executed. This configuration program can be a conventional Set Configuration program provided on a system Reference Diskette included with IBM PS/2 computer systems. The Reference Diskette is sometimes referred to as a diagnostic, maintenance or service diskette. The purpose of the configuration program is to store values characterizing the configuration of this system 100 to NVRAM 248 which are saved when power is removed from the system. The NVRAM can be a low power CMOS memory with a battery backup.

Connected to the keyboard/mouse controller 244 are a port A 278 and a port B 280. These ports A,B are used to connect the keyboard 110 and the mouse 112 to the personal computer system 100. Coupled to the serial adapter 240 is a serial connector 276. An optional device, such as a modem (not shown), can be coupled to the system through this connector 276. Coupled to the parallel adapter 238 is a parallel connector 274 to which a device, such as the printer 114, can be connected. Connected to the diskette adapter 246 is a diskette connector 282 used to attach one or more diskette drives 108.

Depending on user requirements, the personal computer system of the present invention is capable of incorporating a variety of processor types. For example, a type 1 processor may include an Intel 486 microprocessor with no cache memory, a type 2 processor may include a 486 microprocessor with 8 K of internal cache (L1), and a type 3 processor may include a 486 microprocessor with bother internal (L1) cache and an external L2 cache. Each of the processor-type variations have an IML image associated with it for handling the specific hardware requirements of the processor. For example, since each processor type uses a different memory arrangement, the memory controller for each type may also vary to accommodate a corresponding processor type. The IML images include necessary routines and information for properly handling the memory controller, and is stored in one, or both, the hardfile 106 or a diskette positioned in the diskette driver 106.

SCSI Controller

In FIG. 3, the I/O or SCSI controller 11 controls SCSI peripheral devices 30 through SCSI bus 70. SCSI controller 11 includes control logic 10, data-phase detector 12, transmission rate detector 15, transmission mode decoder 20, ACK line driver 60 and data drivers 61. In the preferred embodiment, for a SCSI bus there are one ACK line and 9 data lines.

FIG. 3 illustrates the hardware implementation of the preferred embodiment of the I/O, or SCSI, controller working with the computing system to dynamically control transmission modes to peripheral devices. The processes performed by the controller in the computing system are illustrated in FIGS. 5A, 5B and 5C.

Figure 5A:
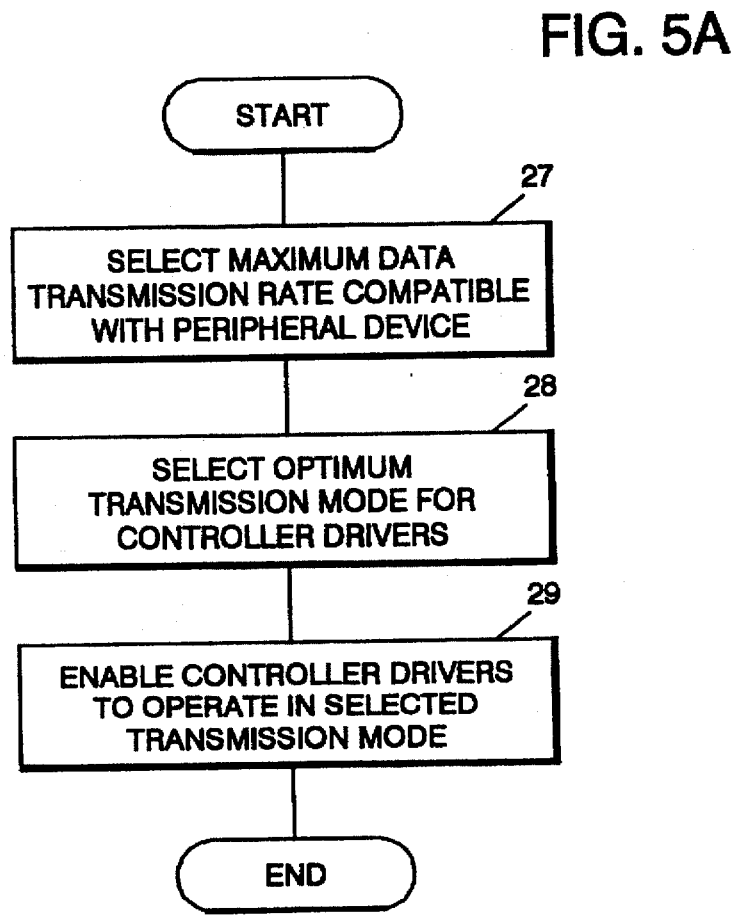
FIGS. 5A, 5B and 5C illustrate another preferred embodiment of the invention in the form of flow diagrams showing the process by which the inventive system selects the data transmission mode for drivers in the controller.
Figure 7A:
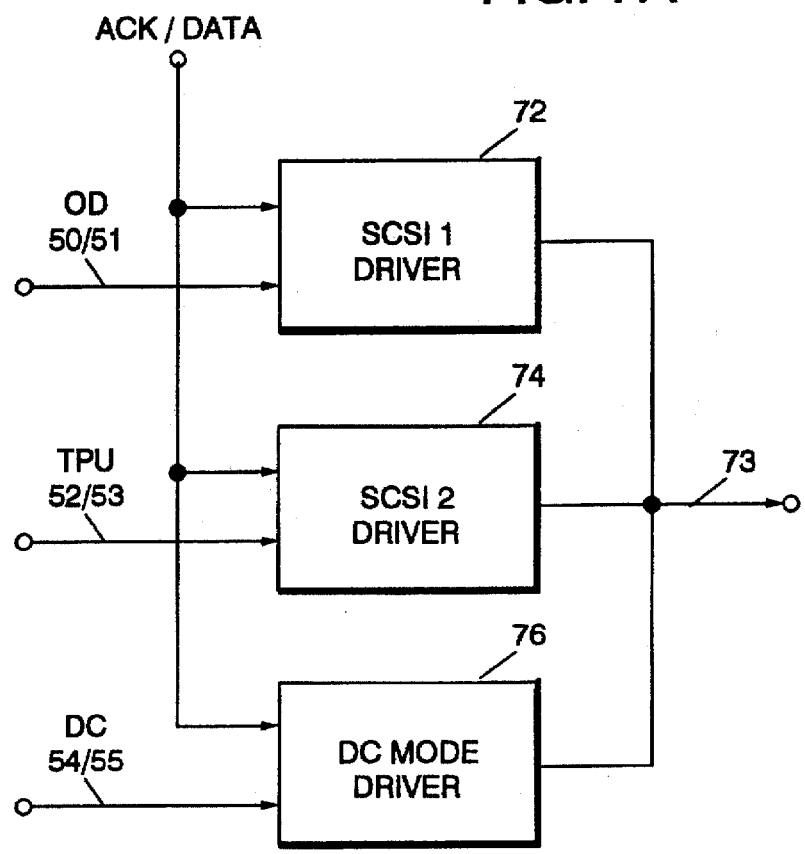
FIGS. 7A and 7B show alternative embodiments for the ACK driver 60 and data drivers 61 in FIG. 3.
Figure 7B:
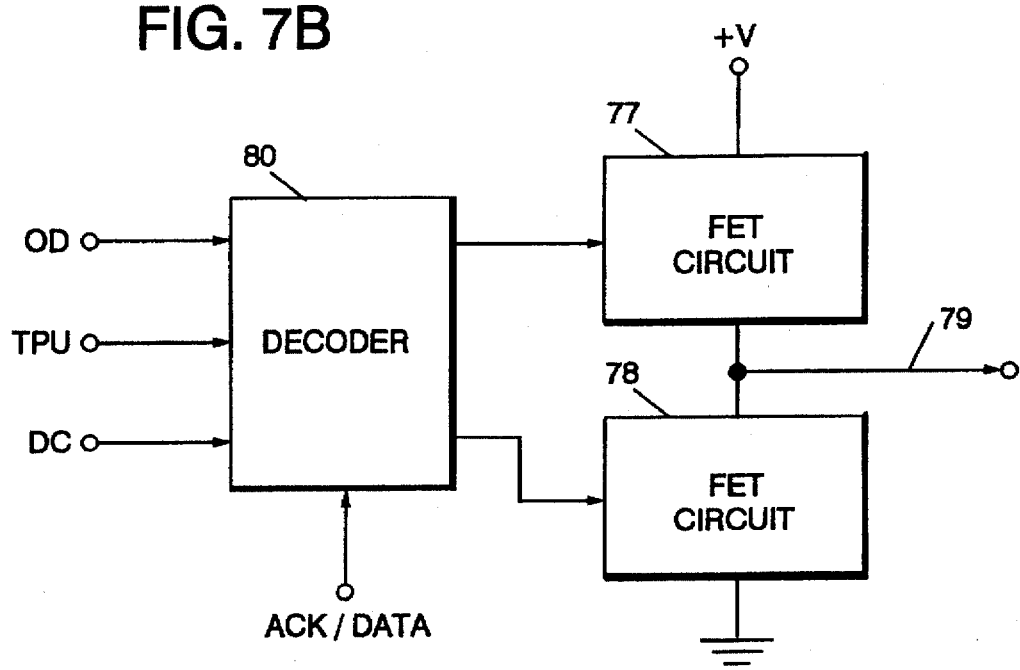

The process begins in FIG. 5A with operation 27 selecting the maximum data transmission rate for the controller that is compatible with the data transmission rate used by the receiving peripheral device. The details of this operation 27 are shown in FIG. 5B and described hereinafter. After the maximum compatible transmission rate is selected, operation 28 selects the optimum transmission mode for the transmission line drivers 60 and 61 (FIG. 3) in the controller. The selection of the transmission mode is based on the maximum compatible data transmission rate. The selected transmission mode is also selectable by option bits set as parameters for the controller by the user. The details of the process for selecting the transmission mode for each driver type, based on the data transmission rate, are illustrated in FIG. 5C described hereinafter. The process of the invention is completed by operation 29 in FIG. 5A. Operation 29 enables the controller drivers to transmit in the selected transmission mode from operation 28. Each driver type ACK or data driver has a driver for each transmission mode in one preferred embodiment, and in a second preferred embodiment, is a single driver capable of operating in each transmission mode. In either embodiment, the selected transmission mode for each driver type enables the driver to transmit to the peripheral device in the selected mode. Details of the drivers are shown in FIGS. 7A and 7B.

Figure 5B:
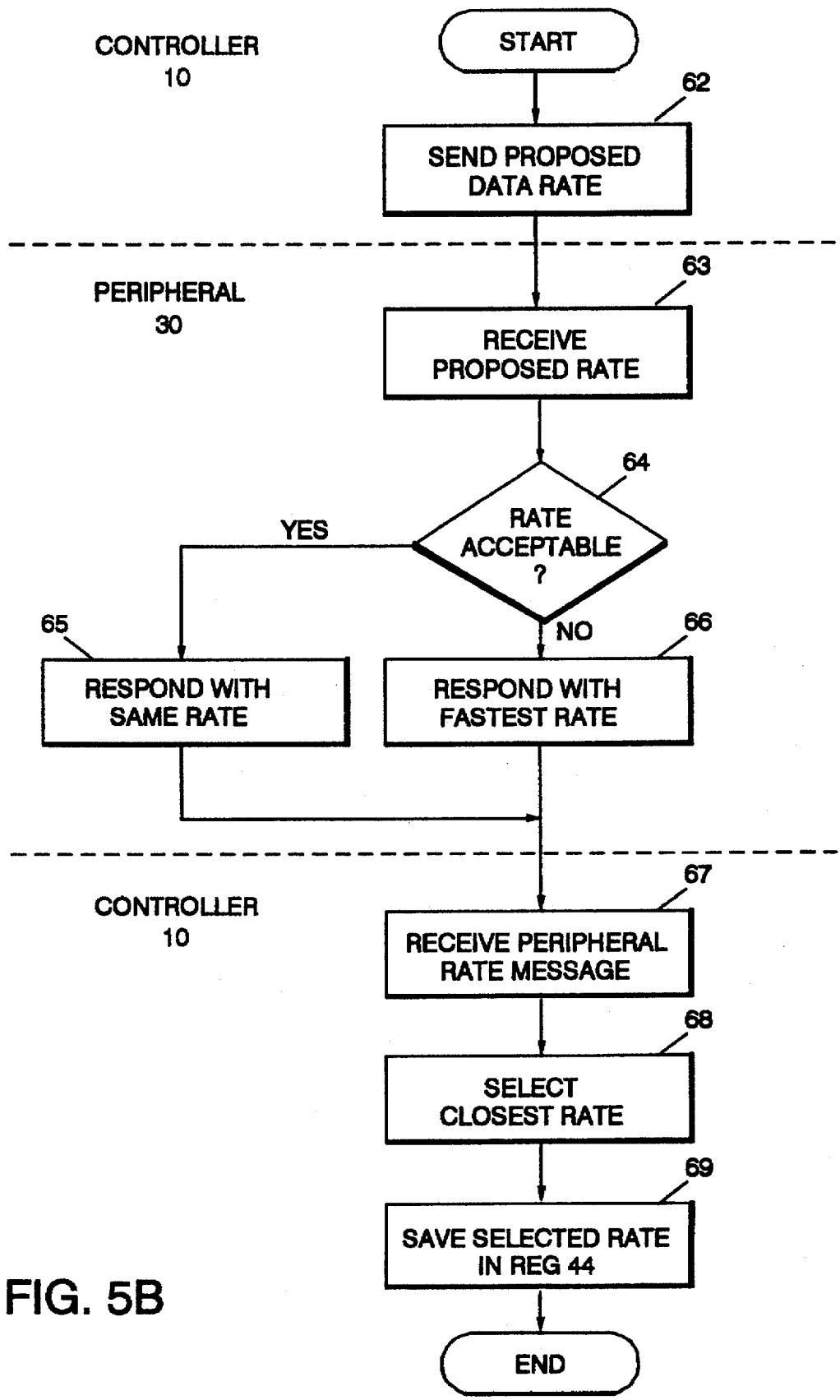
Figure 5C:
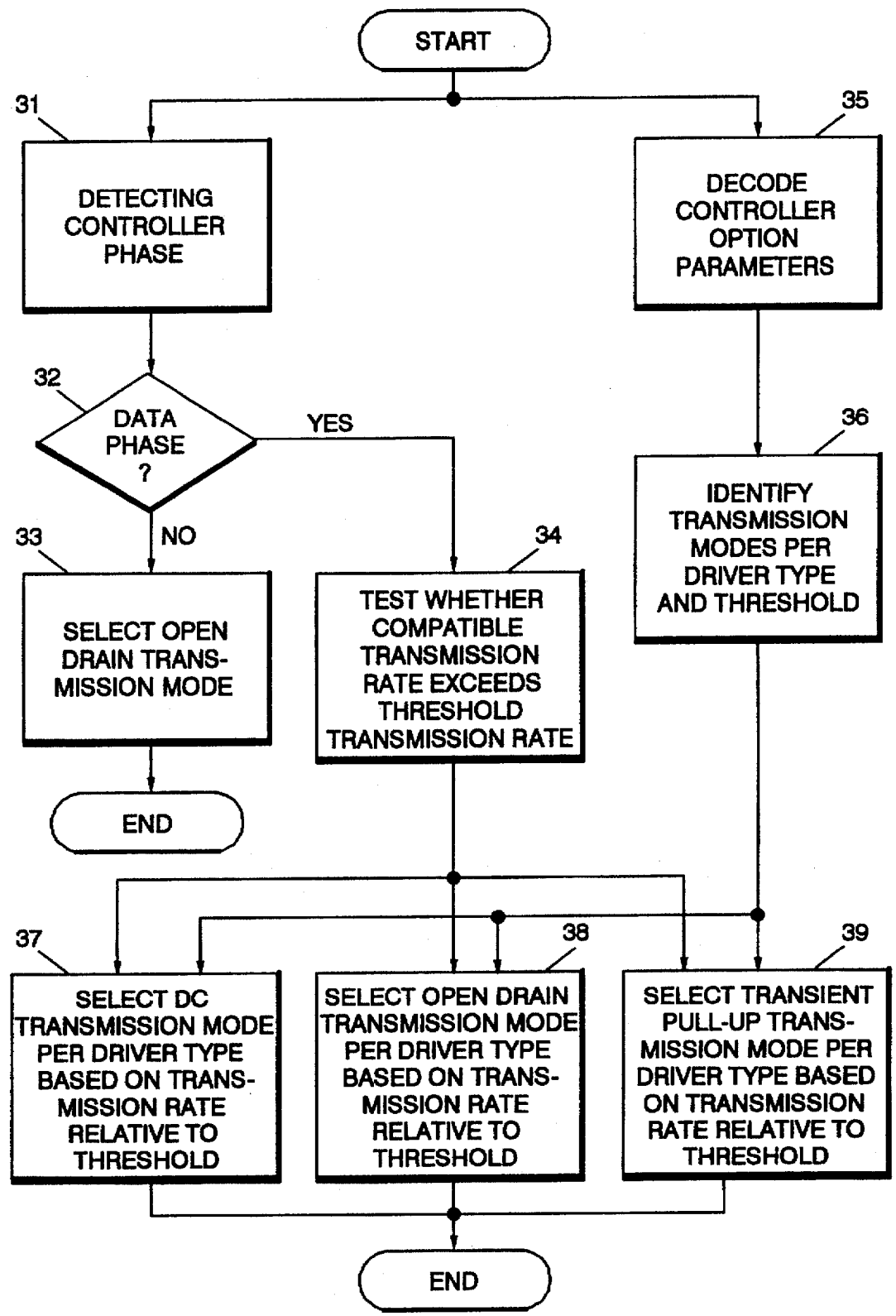

The process in FIG. 5B to determine the maximum compatible data transmission rate for each peripheral device begins when controller 11 interrogates peripheral device 30. FIG. 5B is a process flow diagram showing how controller 11 and peripheral device 30 exchange data transmission rate information to match their data transmission rates.

In FIG. 5B, controller 10 at operation 62 sends a synchronous negotiation message to peripheral 30 with a proposed data rate. The controller generally proposes its maximum speed. In peripheral 30, operation 63 receives the message with the proposed rate, and decision operation 64 tests whether the rate is acceptable. The process flow branches Yes to operation 65, if peripheral 30 can operate at the proposed rate, and branches No to operation 66 if the proposed rate is too fast. If the proposed rate is acceptable, operation 65 sends back to control logic 10 over bus 70 and line 24 a sync negotiation message with the same rate as the peripheral received. If the proposed rate is too fast, operation 66 sends a message back to control logic 10 which contains the peripheral's fastest acceptable rate.

Control logic 10 (FIG. 3) in operation 67 receives the peripheral rate message. Operation 68 in the control logic selects a data transmission rate that the controller 11 supports and is closest to the peripheral's fastest rate. The selected rate is equal to or less than the rate the peripheral sent back in the peripheral rate message. Operation 69 stores this maximum compatible rate in register 44 in the control logic. Controller 11 will use the maximum compatible data rate whenever it communicates with peripheral 30.

To select the transmission mode, the process in FIG. 5C begins by operation 31 detecting whether the controller is in a data-phase or a non-data phase. Decision operation 32 branches the process to operation 33 if the controller is in non-data phase, and to operation 34 if the controller is in the data-phase. In a non-data phase transmission, all drivers in the controller are set to the open drain, or SCSI 1 mode, by operation 33 since the transmission rate for messages and commands is generally much lower than for data transmission. In data-phase, operation 34 tests whether the compatible transmission rate for the peripheral device exceeds a threshold transmission rate. If the threshold is exceeded, a data rate bit is set for subsequent use in selecting the correct transmission mode.

While operations 31 through 34 are performed, operation 35 in FIG. 5C decodes the option parameters provided to the controller from the computing system. These parameters may be set by the user of the system. In the preferred embodiment, there are three option bits giving the user a choice of eight possible configurations for the controller in selecting transmission modes. Operation 36, in response to the decoded parameters, identifies for each driver type, ACK driver and data driver, the proper transmission mode when the compatible transmission rate exceeds and does not exceed the threshold transmission rate. Operation 36 provides this transmission mode information to each of the selection operations 37, 38 and 39 in FIG. 5C.

The preferred embodiment of the invention uses three transmission modes: Open drain, transient pull-up and DC. Selection operation 37 selects ACK driver or data drivers to DC mode, as identified by operation 36 depending on the data rate bit from operation 34. Similarly, operations 38 and 39 select open drain mode, or transient pull-up mode, for the ACK driver and data drivers. The logic table in FIG. 6 indicates the selections made by operations 34, 37, 38 and 39, depending on the input conditions, which include data phase, data rate, and option bit parameters.

The preferred embodiment of the invention in FIG. 3 illustrates how the processes in FIGS. 5A, 5B and 5C are implemented in hardwired logic. In FIG. 3, data phase detector 12 reads the SCSI phase C/D (command/data) bit on signal line 13, and MSG bit on signal line 17 from the SCSI bus 70 to determine whether the controller drivers are sending data or non-data (such as arbitration or command phases).

Figure 4:
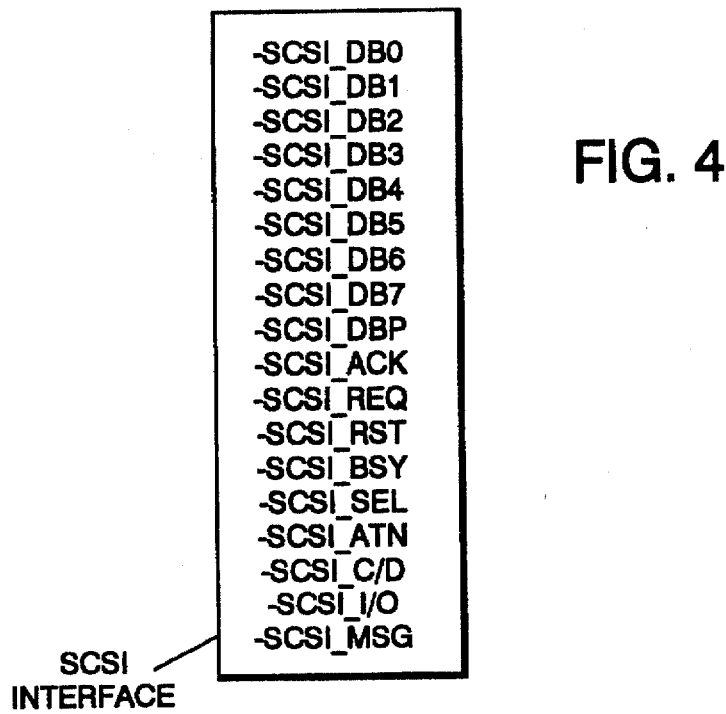
FIG. 4 is a table illustrating the transmission lines used in SCSI bus.

FIG. 4 shows the pins of a SCSI connector. For more detail, refer to ANSI standard X3T9.2. Pins DB0–DB7 contain eight bit bidirectional data. Pin DBP carries the odd parity of the eight bits of data. Pin ACK (acknowledge) performs handshaking, along with pin REQ. Pin RST indicates a reset condition. Pin BSY indicates the SCSI bus is being used. Pin SEL is used in the SCSI selection/reselection process to indicate which peripheral owns the bus. Pin ATN indicates a message transfer request. Messages include error messages and the like. Pin C/D indicates whether there is command or data information on the bus. Pin I/O controls the direction of information transfer. Pin MSG indicates a message phase.

Peripheral 30 sets the C/D and MSG bits. Phase detector 12 functions as a NOR gate, sending a one on signal line 14 if C/D on line 13 and MSG on line 17 are zero. If C/D is zero, it indicates the operative phase is not command phase. If MSG is zero, the operative phase is not message phase. Therefore, the operative phase is not a non-data phase and must be data-phase. Thus, data phase detector 12 sends a zero on signal line 14 to decoder 20, if the controller is in a non-data phase, and sends a one if the controller is in a data phase.

In the preferred embodiment, the control logic 10 provides four bits which indicate the data rate. Transmission rate detector 15 reads the four rate bits from register 44 in control logic 10, and determines whether the data rate is less than, or equal to, 5 MHz, or whether the rate is greater than 5 MHz. The four rate bits appear on signal lines 40–43, and can have binary values ranging from 0000 to 1111. Rate bits valued as 0000 through 0011 are sent when the data rate is over 5 MHz. Rate bits of 0100 are sent from the control logic 10 when the rate is 5 MHz, and rate bits from 0101 through 1111 from control logic 10 indicate a rate less than 5 MHz.

Rate detector 15 receives and analyses the four bit word from register 44 to detect the selected transmission rate. Rate detector 15 generates and sends a zero (indicating a rate of 5 MHz or less) to the decoder 20 over line 16 when the rate bits are 0100 or greater. The rate detector generates and sends a one (indicating a rate over 5 MHz) when the rate bits are 0011 or less. Of course, as described above for FIG. 5, the data rate the controller 11 uses matches the rate used by the peripheral device that the controller is transmitting to.

Decoder 20 uses the data-phase bit on line 14 and the data-rate bit from line 16 to determine whether controller 11 is to transmit in open drain (SCSI 1) mode, TPU (transient pull-up or SCSI 2) mode, or DC mode. The DC mode is similar to transient pull-up, except instead of the driver releasing the signal after driving it high, the driver is on all of the time. DC mode is not a supported SCSI standard, but is useful for testing in very noisy conditions.

The interpretation of the data-rate bit by decoder 20 to select which mode to use for transmission to each driver type, ACK or data driver, is determined by the option specified by the user setting parameters for the SCSI controller of the present invention. Three option bits are preselected by the user; these option bits are loaded into register 48 in control logic 10, and are sent over lines 45–47 to the decoder 20. Controlling software that runs in the personal computer processor writes the three option bits to register 48. The controlling software could be implemented in the BIOS software, or in device driver software for the controller. The option bits are used by decoder 20 as a part of the process in selecting a transmission mode.

Once decoder 20 selects a transmission mode—open drain (SCSI 1), TPU (SCSI 2) or DC—, it drives one control line in each of the two sets three control lines. One set leads to ACK driver 60 and controls its mode of transmission, and the other set leads to data drivers 61 to control their transmission mode.

Acknowledge signal (ACK) driver 60 receives the acknowledgement signal from controller 10 over line 25. Data driver 61 receives the data from controller 10 over lines 26 and drives the data out over the SCSI bus 70 to peripheral device 30.

If transmission is in open drain mode, lines 50 and 51 go high, signaling ACK driver 60 and data driver 61 to transmit in open drain mode to SCSI bus 70. When lines 52 and 53 go high for TPU mode, lines 54 and 55 go high for DC mode to signal the ACK driver and data drivers to use TPU mode and DC mode, respectively.

Figure 6:
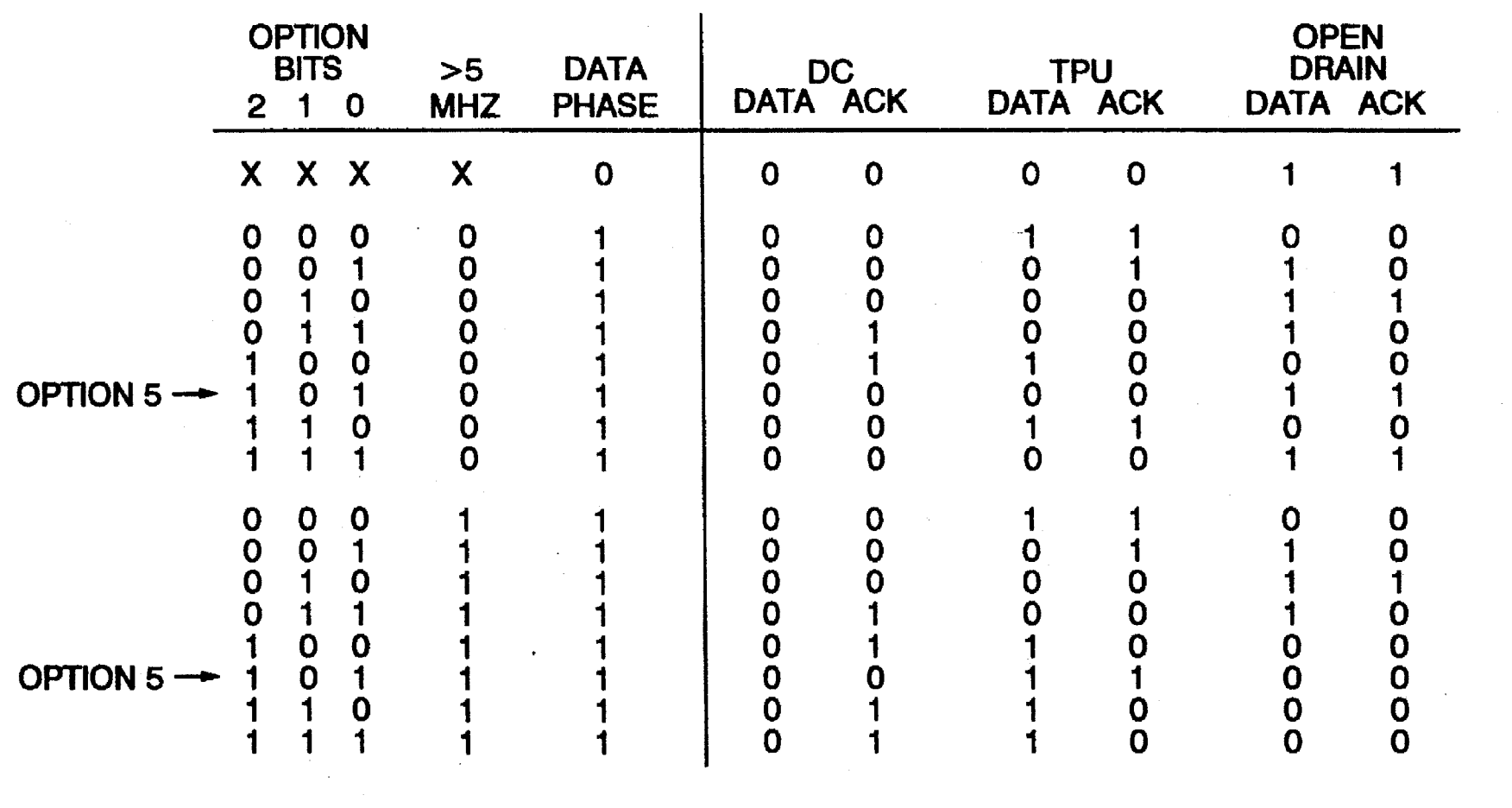

FIG. 6 shows a truth table for decoding operations performed by decoder 20. In FIG. 6, the input conditions are the data phase bit, data rate bit, and three option bits. For example, if option 5 (101 binary) was selected by the user and if the rate bit is zero (less than or equal to 5 MHz) and the data phase bit is 1 (controller is in data phase operative mode), then the open drain mode signal lines 50 and 51 are high (or one) to both the ACK driver 60 and the data drivers 61. Thus, the nine data lines and the acknowledge (ACK) line are used in open drain (SCSI 1) mode.

If the controller is in data phase operations and if the data rate is over 5 MHz, then in user-selected option 5, decoder sends a one over TPU (SCSI 2) mode lines 52 and 53 to ACK driver 60 and data drivers 61 in FIG. 3. Now, the nine data lines and the acknowledge (ACK) line are used in TPU (SCSI 2) mode.

If controller 11 is in a non-data phase, open drain is always used for both the ACK driver and the data drivers. This is done because non-data phases operate at a much lower transmission rate than data phases. This is true for all of the options. Therefore, decoder 20 would simply set open drain mode lines 50 and 51 to one for both the ACK driver 60 and the data drivers 61 when the decoder detects a non-data phase condition from the data phase bit.

Option 5 is likely to be the option most often used because it is logical to send the data and ACK lines in the same mode and to use SCSI 1 mode for data rates of 5 MHz and below, and use SCSI 2 mode for data rates of over 5 MHz. However, as seen in the table of FIG. 6, there are seven other option modes provided in the preferred embodiment since there are three option bits. In other option modes illustrated in FIG. 6, the ACK driver and the data drivers are not in the same transmission mode. In some options, the ACK driver is in TPU mode and the data drivers are in open drain mode. Also, some options provide for the ACK driver to be in DC mode, while the data drivers are in TPU or open drain mode. Depending on the conditions, the user might change the option bits to select various mixed modes.

The ACK driver 60 and each of the nine data drivers 61 may be implemented as shown in FIG. 7A. Each transmission mode has a seperate driver that is enabled by its transmission mode input line. In Open Drain (OD) mode at the ACK driver, OD line 50 enables the SCSI 1 driver 72 to drive the ACK line 73 in open drain mode in transmitting the acknowledge signal to the active peripheral device. During this operation, SCSI 2 driver 74 and DC mode driver 76 would be inhibited as the TPU mode line 52, and the DC mode line 54 to the ACK driver would be low or zero.

Operation at the data drivers would be the same as just discussed for the ACK driver with two exceptions. First, the drivers in FIG. 7A would be duplicated nine times, one for each of the nine data lines. Second, the OD, TPU and DC mode signals would arrive over lines 51, 53 and 55, respectively, so that the ACK driver and data drivers could be operated in different modes.

In the preferred embodiment of the invention, the ACK driver and each data driver are implemented as shown in FIG. 7B. FET circuits 77 and 78 (field effect transistors with appropriate biasing circuit elements) are connected from source of FET 77 to drain of FET 78. Output 79 of the driver is also connected at this junction point between the FETs. In open drain mode, the high to low transition on the line is accomplished by activating FET 78. Low to high transition is accomplished passively without activating FET 77. Instead, the SCSI terminator resistor on the transmission line causes the signal on output 79 to be pulled high.

In transient pull-up mode, the high to low transition is also the result activating FET 78. Low to high transition is accomplished actively by activating FET 77. After the transmission line signal reaches the high level, FET 77 is deactivated. This results in a transition that "looks like" open drain mode, except the transition is faster and cleaner. DC mode is similar to transient pull-up mode except FET 77 is not deactivated after it pulls up the transmission line signal.

Decoder 80 receives the transmission mode signal, OD, TPU or DC, over lines 50/51, 52/53 and 54/55, respectively. Decoder 80 also receives the ACK signal line, or one of the nine data lines. Decoder 80, depending on the transmission mode and whether the ACK or data input is high or low, drives the FET circuits to produce an up or down transition in OD, TPU or DC mode.

It will be appreciated by one skilled in the art that other configurations of ACK and data drivers might be used besides those shown in FIGS. 7A and 7B. Further, the invention might be implemented with a processor performing the operations in FIGS. 5A, 5B and 5C, as well as the hardwired logic implementation in FIG. 3. Of course, a combination of processor operations and hardwired logic might also be used. In all of these implementation variations for the invention, the common thread is that the computing system with this invention has a dynamic SCSI controller that can adapt the system to different transmission modes for communication with different types of peripheral devices.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. In a computing system having a multiple data transmission mode and a multiple data transmission rate I/O controller and at least one peripheral device connected to the I/O controller over a transmission line bus, a method for selecting the data transmission rate and the data transmission mode of drivers in the I/O controller, said drivers transmitting signals, in a plurality of data transmission modes and a plurality of data transmission rates, over the bus from said I/O controller to each peripheral device, said method comprising the steps of:

detecting user-defined parameters provided to the I/O controller by the computing system to enable a user to define how the data transmission mode of the drivers of the I/O controller is to be selected as a function of a maximum compatible data transmission rate and a phase of signals between the I/O controller and each peripheral device;

determining, for each peripheral device a maximum compatible data transmission rate that is closest to and not greater than the maximum data transmission rate of that peripheral device;

detecting a phase in which the signals are transmitted on the bus by the I/O controller to each peripheral device;

selecting a data transmission mode for each peripheral device based on the maximum compatible data transmission rate, user-defined parameters that define a data transmission mode as a function of the compatible data transmission rate and the phase; and enabling the drivers to transmit in the maximum compatible data transmission rate and in the selected data transmission mode for each peripheral device when transmitting from the I/O controller to the peripheral device.

2. The method of claim 1 wherein said step of determining a maximum compatible data transmission rate further comprises the steps of:

sending a proposed data transmission rate by the I/O controller to each peripheral device;

responding by each peripheral device with a data transmission rate that is equal to the proposed data transmission rate if said proposed data transmission was acceptable, and with a fastest acceptable data transmission rate if the proposed data transmission rate was unacceptably fast; and selecting, as the maximum compatible data transmission rate for each peripheral device, a rate that is either equal to, or a rate that is closest and less than, the data transmission rate received from each peripheral device.

3. The method of claim 1 wherein said drivers transmit in a plurality of data transmission modes including at least an open drain mode, and wherein said data transmission mode selecting step further comprises the steps of:

detecting when the I/O controller is in a non-data operative phase, transmitting signals other than data; and selecting the open drain mode as the selected data transmission mode when the I/O controller is in the non-data operative phase.

4. The method of claim 1 wherein said drivers transmit in a plurality of data transmission modes including at least an open drain mode and a transient pull-up mode, and wherein said data transmission mode selecting step further comprises the steps of:

detecting whether the maximum compatible data transmission rate exceeds a threshold data transmission rate;

selecting the open drain mode as the selected data transmission mode if the maximum compatible data transmission rate does not exceed the threshold data transmission rate; and selecting the transient pull-up mode as the selected data transmission mode if the maximum compatible data transmission rate exceeds the threshold data transmission rate.

5. The method of claim 1 wherein said I/O controller includes multiple sets of drivers, each set of drivers operating in a single data transmission mode that is different from Other sets, and said enabling step further comprises the steps of:

enabling the set of drivers operating in the selected data transmission mode; and inhibiting all other sets of drivers.

6. The method of claim 1 wherein each of said drivers transmits in a plurality of data transmission modes including at least a DC mode, an open drain mode and a transient pull-up mode, and wherein said enabling step enables each driver to operate in the selected data transmission mode.

7. The method of claim 1, wherein said transmission mode selecting step further comprises the steps of:

detecting whether the maximum compatible data transmission rate exceeds a threshold data transmission rate;

decoding the user-defined parameter to identify a first data transmission mode for a maximum compatible data transmission rate exceeding the threshold data transmission rate and a second transmission mode for a maximum compatible data transmission rate not exceeding the threshold data transmission rate;

selecting the first data transmission mode as the selected data transmission mode if the maximum compatible data transmission rate exceeds the threshold data transmission rate; and selecting the second data transmission mode as the selected data transmission mode if the maximum compatible data transmission rate does not exceed the threshold data transmission rate.

8. The method of claim 7 wherein each driver in the I/O controller transmits in a plurality of data transmission modes including at least the first and the second data transmission mode, and said enabling step enables each driver to operate in the selected data transmission mode.

9. In a computing system having a multi-mode I/O controller and at least one peripheral device connected to the I/O controller over a transmission line bus, a method for controlling the data transmission mode of drivers in the controller, the drivers transmitting signals on the transmission line bus from the I/O controller to each peripheral device, said method comprising the steps of:

detecting user defined parameters provided to the I/O controller by the computing system to enable a user to select a data transmission mode as a function of a maximum compatible data transmission rate and a data phase of signals between the I/O controller and each peripheral device;

detecting a data phase of the signals transmitted on the transmission line bus from the I/O controller to each peripheral device;

selecting for each peripheral device a maximum compatible data transmission rate between the I/O controller and the peripheral device;

selecting a transmission mode for each peripheral device based on the detected user defined parameters, the data phase, and the compatible data transmission rate between the I/O controller and the peripheral device receiving the data transmission; and enabling the drivers to transmit in the selected transmission mode for each peripheral device when transmitting from the I/O controller to the peripheral device.

10. In a computing system having a multi-mode I/O controller and at least one peripheral device connected to the I/O controller over an I/O bus, an apparatus for selecting the data transmission mode of drivers in the I/O controller, said drivers transmitting signals, including data, over the bus from said I/O controller to each peripheral device, said apparatus comprising:

a control logic for detecting user-defined parameters provided to the controller by the computing system, wherein said user-defined parameters enable a user to define how the data transmission mode of the drivers in the I/O controller are to be selected;

a rate detector for selecting for each peripheral device a maximum data transmission rate compatible with that peripheral device;

a phase detector for determining the phase in which the signals are being transmitted over the bus between the I/O controller and the peripheral device; and a transmission mode decoder for selecting a data transmission mode for the drivers in the I/O controller, when the drivers are transmitting to each peripheral device, based on the maximum compatible data transmission rate for the peripheral device receiving the data transmission, the user-defined parameters and the phase, and said decoder enabling the drivers to transmit in the selected data transmission mode for each peripheral device when the drivers are transmitting from the I/O controller to the peripheral device.

11. The apparatus of claim 11 wherein said transmission mode decoder operates to:

detect whether the maximum compatible data transmission rate exceeds a threshold data transmission rate;

decode the user-defined parameters to identify a first data transmission mode for maximum compatible data transmission rates exceeding the threshold data transmission rate, and to identify a second data transmission mode for maximum compatible data transmission rates not exceeding the threshold data transmission rate;

select the first data transmission mode as the selected data transmission mode if the maximum compatible data transmission rate exceeds the threshold data transmission rate; and select the second data transmission mode as the selected data transmission mode if the maximum compatible data transmission rate does not exceed the threshold data transmission rate.

12. The apparatus of claim 11 wherein each driver in the I/O controller transmits in a plurality of data transmission modes including at least the first and the second data transmission mode, and wherein said transmission mode decoder enables each driver to operate in the selected data transmission mode.

13. The apparatus of claim 10 wherein said transmission mode decoder operates to:

detect whether the maximum compatible data transmission rate exceeds a threshold data transmission rate;

select a first data transmission mode as the selected data transmission mode if the maximum compatible data transmission rate exceeds the threshold data transmission rate; and select a second data transmission mode as the selected data transmission mode if the maximum compatible data transmission rate does not exceed the threshold data transmission rate.

14. The apparatus of claim 13 wherein each driver in the I/O controller transmits in a plurality of data transmission modes including at least the first and the second data transmission modes, and said transmission mode decoder enables each driver to operate in the selected data transmission mode.

15. The apparatus of claim 13 wherein the I/O controller has a first set of drivers transmitting in the first data transmission mode and a second set of drivers transmitting in the second data transmission mode, and wherein said transmission mode decoder operates to:

enable the first set of drivers when the first data transmission mode is selected by said transmission mode decoder; and enable the second set of drivers when the second data transmission mode is selected by said transmission mode decoder.

16. A multi-mode SCSI controller apparatus for sending data or non-data transmission in one of a plurality of selectable transmission modes including at least SCSI 1 and SCSI 2 modes, the transmissions being sent over a SCSI bus from the controller apparatus to peripheral devices attached to the bus, said SCSI controller apparatus comprising:

phase determining means for determining whether the controller is currently transmitting in a data or a non-data phase;

rate determining means for determining the data rate at which the controller is currently transmitting;

option defining means for providing user-defined parameters to the controller;

decoding means responsive to the data rate determined by said rate determining means, the phase determined by said phase determining means, and the user-defined parameters provided by said option defining means, for selecting the SCSI 1 or the SCSI 2 mode as the transmission mode; and driving means responsive to said decoding means for transmitting the determined data or non-data over the SCSI bus in the selected SCSI 1 or SCSI 2 mode.

17. The apparatus of claim 16 wherein the SCSI 1 mode comprises an open drain mode, and wherein the SCSI 2 mode comprises a transient pull-up mode.

* * * * *